Patented May 8, 1934

1,958,013

UNITED STATES PATENT OFFICE 1,958,013

LAMINATED SAFETY GLASS

George H. Murray, Nixon, N. J.

No Drawing. Application January 27, 1931, Serial No. 511,649

1 Claim. (Cl. 49—81)

The present invention relates to laminated safety glass, particularly of the type wherein a pair of sheets of glass is secured against the opposite sides of a sheet of cellulose ester plastic, such as celluloid, cellulose acetate or the like, and the present invention has for an object to provide an improved adhesive coating adapted to thoroughly unite the intermediate sheet of cellulose ester plastic to the adjacent inner faces of the sheets of glass.

Another object of the present invention is to provide a coating of this character which not only possesses the necessary adhesive qualifications, but which also acts as a protection to the cellulose ester plastic to filter out or absorb the ultra-violet rays passing through the sheets of glass, so that the laminated safety glass as a composite structure will be maintained clear and free from discoloration for a relatively long period of time.

Another object of the present invention is to provide an improved coating which is soluble in water, so that it may be reduced to a proper consistency for application by spraying, or other desired method, so as to admit of the quick and easy and economical application of the adhesive to the inner faces of the sheets of glass, and so that by one or several applications, the coating of the adhesive may be built up to the desired thickness.

A further object of the present invention is to provide a coating of this character which is soluble in water and which, subsequent to application upon the inner faces of the sheets of glass, may be subjected to a drying process, such as by the application of heat to drive off the water to the desired extent so as to provide a coating of the desired consistency.

In carrying out the above objects, the present invention provides a coating having a base of a boric compound of a mono or polyalkyl glycol, or any polymerization product thereof.

Thus, the basic composition of the adhesive is substantially mono or a polyalkyl glycol borate. This substance is soluble in water, and for the purposes of reducing the same to a working condition for application to the inner sides of the sheets of glass, the substance is admixed with a suitable quantity of water, which may be of ½, 1, 2, 5, 10 or other desired percent for the purpose of controlling the thickness of the adhesive on the glass.

This substance, with its water content, is then applied to the inner sides of the sheets of glass by means of a spray, brush, dipping or the like, and the operation may be repeated any desired number of times with the intermediate steps of drying, and the drying of the layer or layers of the adhesive may be carried out by the application of heat at a desired degree, such as at 100 degrees C.

After the adhesive coating has been built up to the desired thickness upon the inner sides of the sheets of glass, the latter are placed against the opposite sides of a sheet of cellulose ester plastic, such as celluloid, cellulose acetate, etc.

The superposed sheets and layers, arranged as above stated, are now subjected to pressure and heat in the ordinary manner of manufacturing laminated safety glass, and the substance of the adhesive coating is found to absorb ultra-violet rays and thus protect the intermediate celluloid sheet from deterioration incident to subjection to the sun's rays.

In addition to the protective feature of the adhesive, above described, it is found to more intimately associate the sheets of glass with the intermediate sheet of celluloid than the present known adhesives now used, and additionally, the present adhesive lends itself to more economical and accurate application to the surfaces of the glass sheets, as the adhesive is soluble in water, and, thus, the desired water content may be added to the adhesive for facilitating the spraying or other application of the same to the glass sheets.

The invention embodies not only the use of water as a solvent for the adhesive, but also other solvents such as, methyl alcohol or other solvent having the desired action on the adhesive to reduce it to a workable state and admit the drying out of the same after application to the inner faces of the glass sheets.

It is, of course, understood that the basic composition of the substance used as a protective and adhesive coating may be varied from the above specifically described formation within the limits of the following claim without departing from the spirit of this invention.

I claim:

A sheet of laminated safety glass comprising a pair of outer sheets of glass, an intermediate sheet of cellulose ester plastic and an adhesive coating formed of a boric compound of alkyl glycol and a solvent to initially provide a liquid to apply upon the inner faces of the sheets of glass, the said liquid coating being heated to form an adhesive of desired consistency which holds the sheets of glass with the intermediate sheet of cellulose ester plastic together, and forms a screen to filter out objectionable ultra-violet rays.

GEORGE H. MURRAY.